(12) United States Patent
Kuriakose et al.

(10) Patent No.: US 8,540,475 B2
(45) Date of Patent: Sep. 24, 2013

(54) SIDE RECOVERY SYSTEM FOR A VEHICLE

(75) Inventors: Sanjeev Kuriakose, Shippensburg, PA (US); Jeffrey L. Weller, Greencastle, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 903 days.

(21) Appl. No.: 12/256,157

(22) Filed: Oct. 22, 2008
(Under 37 CFR 1.47)

(65) Prior Publication Data
US 2009/0263222 A1 Oct. 22, 2009

Related U.S. Application Data

(60) Provisional application No. 60/982,023, filed on Oct. 23, 2007.

(51) Int. Cl.
*B60P 1/04* (2006.01)

(52) U.S. Cl.
USPC .......................................... 414/470; 414/471

(58) Field of Classification Search
USPC ................................... 414/470, 471
See application file for complete search history.

(56) References Cited

U.S. PATENT DOCUMENTS

| 3,783,267 | A | * | 1/1974 | Thomas | 362/523 |
|---|---|---|---|---|---|
| 8,192,135 | B2 | | 6/2012 | Ceccarelli et al. | |
| 2004/0221673 | A1 | * | 11/2004 | Mojzis | 74/469 |
| 2004/0228714 | A1 | * | 11/2004 | Ceccarelli et al. | 414/563 |
| 2008/0038106 | A1 | * | 2/2008 | Spain | 414/563 |

OTHER PUBLICATIONS

Vehicle having a recovery device understood to be commercially available from American Enterprises of Oregon, OH on Oct. 18, 2007 (14 images, 7 sheets).
Vehicle having a recovery device understood to be commercially available from Trebron, Inc. of Coralville, IA on Aug. 24, 2007 (2 images, 2 sheets).
Vehicle having a recovery device understood to be commercially available from Trebron, Inc. of Coralville, IA on Aug. 24, 2007 (7 images, 4 sheets).
Promotional materials for a recovery device of a type understood to be commercially available from Idaho Wrecker Sales; printed from website http://sidepuller.com; Oct. 16, 2006; one sheet.
Ceccarelli, Chuck, "Sidepuller at work," American towman; printed from website http://towman.com; Oct. 17, 2006.
Promotional materials for a recovery device of a type understood to be commercially available from Danco Products; printed from website http://dancoproducts.com; Apr. 9, 2007; two sheets.
Office Action for U.S. Appl. No. 12/271,774 dated Sep. 28, 2011, 8 pages.

* cited by examiner

*Primary Examiner* — Saul Rodriguez
*Assistant Examiner* — Willie Berry, Jr.
(74) *Attorney, Agent, or Firm* — Foley & Lardner LLP

(57) ABSTRACT

A recovery vehicle having a side recovery system is disclosed. The side recovery system includes a boom having a first end and a second end. The boom is rotatable about the first end between a first position and second position. The side recovery system also includes a base having a portion for supporting the first end of the boom, a first receiving structure for securing the second end of the boom when the boom is in the first position, and a second receiving structure for securing the second end of the boom when the boom is in the second position. The boom further includes a locking device configured to selectively engage the first receiving structure and the second receiving structure for securing the second end of the boom.

17 Claims, 9 Drawing Sheets

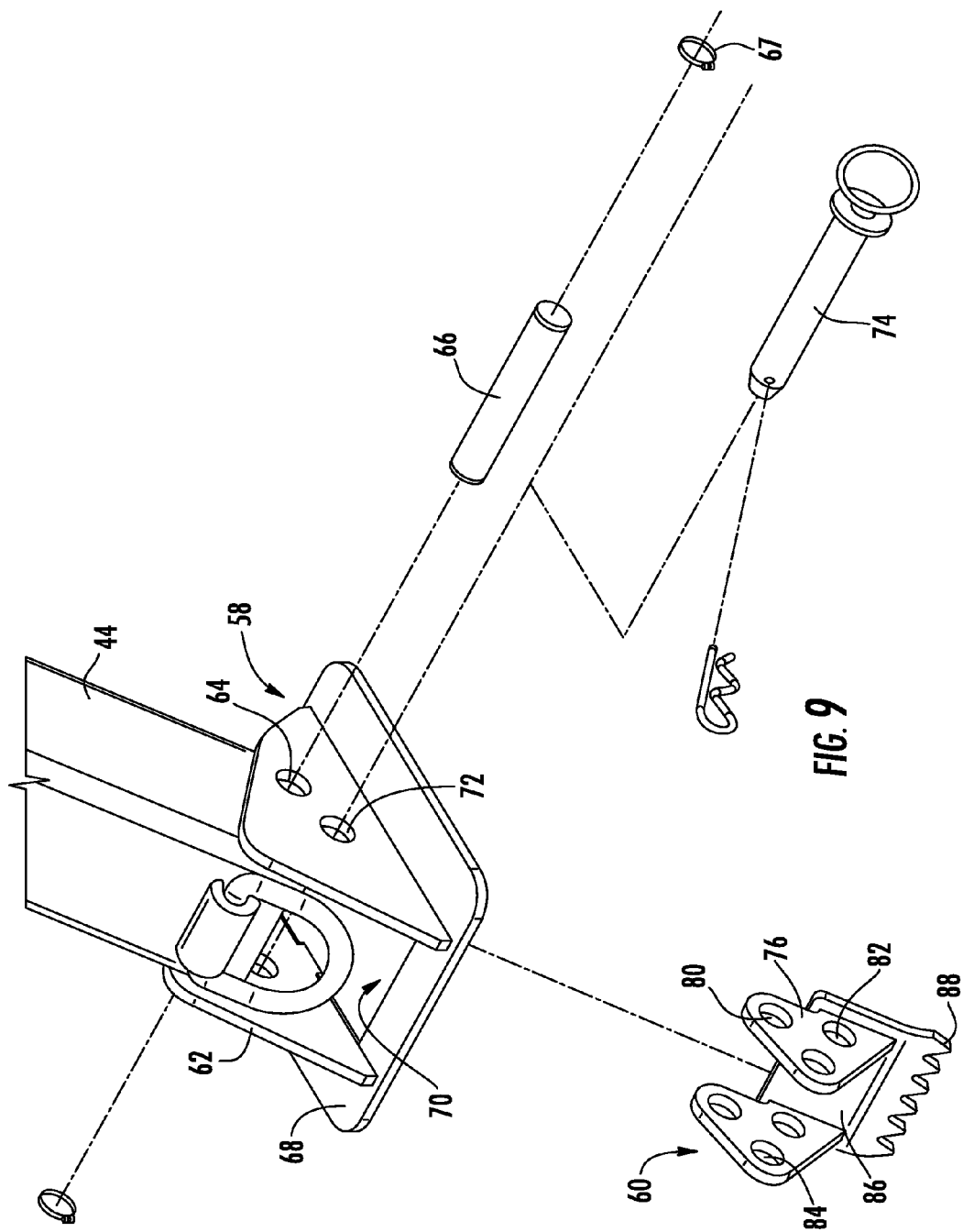

SIDE RECOVERY SYSTEM FOR A VEHICLE

CROSS REFERENCE TO RELATED PATENT APPLICATIONS

The present application claims the benefit under 35 U.S.C. §119(e) of U.S. Provisional Application No. 60/982,023, having a filing date of Oct. 23, 2007, titled "Side Recovery System for a Vehicle," the complete disclosure of which is hereby incorporated by reference.

BACKGROUND

The present disclosure relates to a side recovery system suitable for use with a vehicle. More specifically, the present disclosure relates to a side recovery system suitable for use with a recovery vehicle, such as a carrier, flat-bed, transporter, etc. The present disclosure also relates to a recovery vehicle that incorporates such a side recovery system.

It would be desirable to provide a side recovery system for a vehicle that can be selectively reconfigured or moved between a first side of the vehicle and a second side of the vehicle to allow for recoveries from each side of the vehicle without requiring the vehicle to support a relatively large and/or expensive system that permanently provides for recoveries from each side of the vehicle. Such a system would provide an improved side recovery system that is smaller, light-weight and/or more cost effective to manufacturer and/or maintain. Such a system may also reduce the amount of time needed to setup the system for a recovery opposite the side of vehicle in which the system is currently setup for. However, the problems posed by this type of arrangement are particularly complicated because they exist within the complexity of the overall recovery vehicle. For example, the sizing constraints of the recovery vehicle cab, the positioning of a deck assembly, wrecker arm and/or light pylon, etc. add to the complexities of the recovery vehicle. Accordingly, the selection of a solution may result in unforeseen complications, cost increases, manufacturing efficiency losses, expensive part configurations, performance losses, etc.

SUMMARY

According to an exemplary embodiment, a side recovery system includes a boom having a first end and a second end. The boom is rotatable about the first end between a first position and second position. The side recovery system also includes a base having a portion for supporting the first end of the boom, a first receiving structure for securing the second end of the boom when the boom is in the first position, and a second receiving structure for securing the second end of the boom when the boom is in the second position. The boom further includes a locking device configured to selectively engage the first receiving structure and the second receiving structure for securing the second end of the boom.

According to another exemplary embodiment, a vehicle includes a chassis and a side recovery system supported at the chassis. The side recovery system includes a boom having a first end and a second end. The boom is rotatable about the first end between a first position and second position. The side recovery system also includes a base having a portion for supporting the first end of the boom, a first receiving structure for securing the second end of the boom when the boom is in the first position, and a second receiving structure for securing the second end of the boom when the boom is in the second position. The boom further includes a locking device configured to selectively engage the first receiving structure and the second receiving structure for securing the second end of the boom.

According to another exemplary embodiment, a stabilizer foot for an outrigger system. The stabilizer foot includes a base portion configured to be pivotally coupled to the outrigger system about a first axis. The base includes a pad having a surface configured to substantially rest on top of a ground surface. The stabilizer foot also includes a spade portion coupled to the base portion and rotatable about the first axis between a first position wherein the stabilizer foot protects against tipping and a second position wherein the stabilizer foot protects against sliding. The spade portion includes an anchor blade configured to penetrate the ground surface

BRIEF DESCRIPTION OF THE DRAWINGS

FIG. 9 is an exploded isometric view of the stabilizer portion shown in FIGS. 7 and 8.

DETAILED DESCRIPTION

Figure 1:
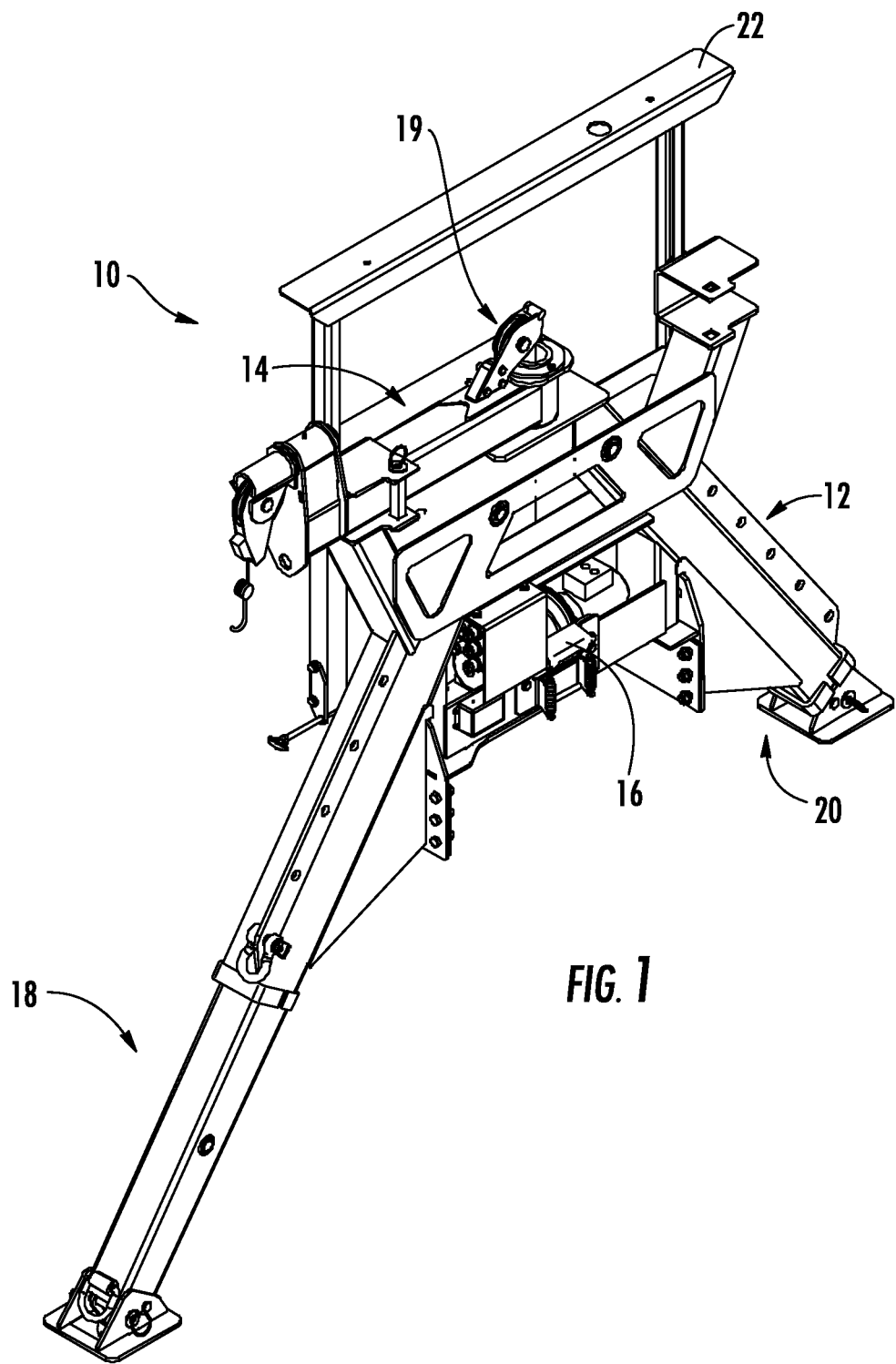
FIG. 1 is an isometric view of a side recovery system according to an exemplary embodiment.

Referring generally to the FIGURES, a side recovery system 10 and components thereof are shown according to exemplary embodiments. Side recovery system 10 is intended to be secured to a recovery vehicle (e.g., carrier, wrecker, tow truck, emergency response vehicle, tractor, crane, etc.) and used for pulling, lifting, hoisting or otherwise manipulating a load (e.g., an obstruction, a container, a disabled vehicle such as an overturned truck, etc.) from a side (e.g., a lateral side, etc.) of the recovery vehicle. Side recovery system 10 is selectively adjustable (e.g., movable, configurable, reconfigurable, etc.) so that side recovery system 10 can be used to manipulate a load from a first side of the recovery vehicle (e.g., a first lateral side, left side, driver-side, etc.) and an opposite second side of the recovery vehicle (e.g., a second lateral side, right side, passenger-side, etc.).

To facilitate the selective adjustability of side recovery system 10, side recovery system 10 generally includes a boom that is movable (e.g., swingable, rotatable, etc.) between a first position for manipulating a load from the first side of a recovery vehicle and a second position for manipulating a load from the second side of the recovery vehicle. The boom extends between a first end and a second end. The first end of the boom is configured to be supported near or at the centerline of recovery vehicle and is the portion of the boom about which the boom is configured to move. The second end of the boom is configured to support at least one sheave that is configured to receive a cable having a hook or some other suitable recovery tool or device coupled thereto for engaging the load. Side recovery system 10 is configured so that the cable can remain received by the at least one sheave while the boom is adjusted between the first and second positions. This may advantageously reduce the amount of setup time that is needed to place side recovery system 10 in an adequate position for completing a recovery task.

According to one exemplary embodiment, the boom is adjusted between the first and second positions by being rotated about an axis at the first end of the boom that extends in a substantially vertical direction (e.g., an axis extending substantially upwards, an axis extending substantially perpendicular to a longitudinal axis of the recovery vehicle, etc.). As such, the boom maintains substantially the same orientation relative to a surface (e.g., a ground surface, a deck surface of a deck assembly, etc.) as the boom rotates between the first position and the second position. For example, the boom may be supported in a substantially horizontal orientation (relative to the surface) such that the boom remains in a substantially horizontal plane as the boom rotates between the first position and the second position. According to an exemplary embodiment, the boom rotates approximately 180 degrees between the first position and the second position. Such an embodiment may be particularly suitable for carriers wherein there is unlikely to be any significant obstructions behind the cab of the vehicle that would interfere with the rotation of the boom with a substantially horizontal plane (e.g., a boom arm of a wrecker, etc.).

According to an exemplary embodiment, side recovery system 10 may also include an outrigger or stabilizer system that includes one or more support members (e.g., outriggers, etc.) that are selectively adjustable between a retracted stowed position, a first use position, in which the stabilizer system functions as a support foot, and a second use position, in which the stabilizer system functions as a spade. As a support foot, the stabilizer system rests on a ground surface and is intended to protect the recovery vehicle from tipping over sideways in the direction of a load engaged by side recovery system 10. As a spade, the stabilizer penetrates the ground surface and is intended to generate a tractive force so that the recovery vehicle resists sliding in a direction of a load engaged by side recovery system 10. According to an exemplary embodiment, in the second use position, the stabilizer system advantageously functions as a support foot and a spade at the same time to protect the vehicle against tipping and to resist sliding. According to the various alternative embodiments, the stabilizer system may function solely as a spade when in the second use position.

Before discussing the details of side recovery system 10, it should be noted at the outset that references to "front," "back," "rear," "upper," "lower," "top," "bottom," "right," and "left" in this description are merely used to identify the various elements as they are oriented in the FIGURES, with "front," "back," and "rear" being relative to the direction of travel of the vehicle and "top," "bottom," "right," and "left" being relative to the perspective of the driver. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1 in particular, side recovery system 10 is shown according to one exemplary embodiment. According to the embodiment illustrated, side recovery system 10 generally includes a support structure (e.g., framework, etc.), shown as a base 12, a member (e.g., arm, swing arm, swivel feature, crane, etc.), shown as a boom 14, supported by the base and configured for pivotal or rotational movement relative base 12, a cable guidance system 19 having at least one pulley and/or sheave supported on boom 14, a winch 16 supported at base 12 and configured to supply a cable to cable guidance system 19, a stabilizer system including first and second outriggers 18, and an auxiliary support structure 22.

Figure 2:
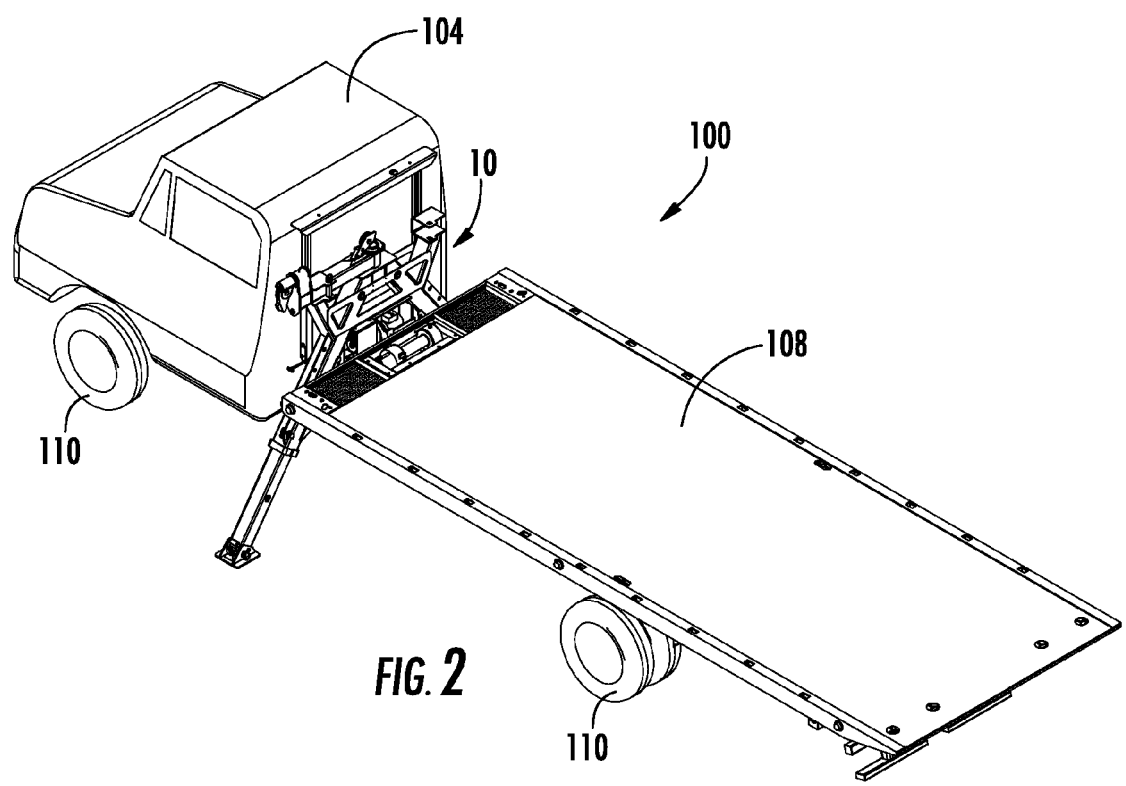
FIG. 2 is an isometric view of a vehicle according to an exemplary embodiment that includes the side recovery system shown in FIG. 1.
Figure 3:
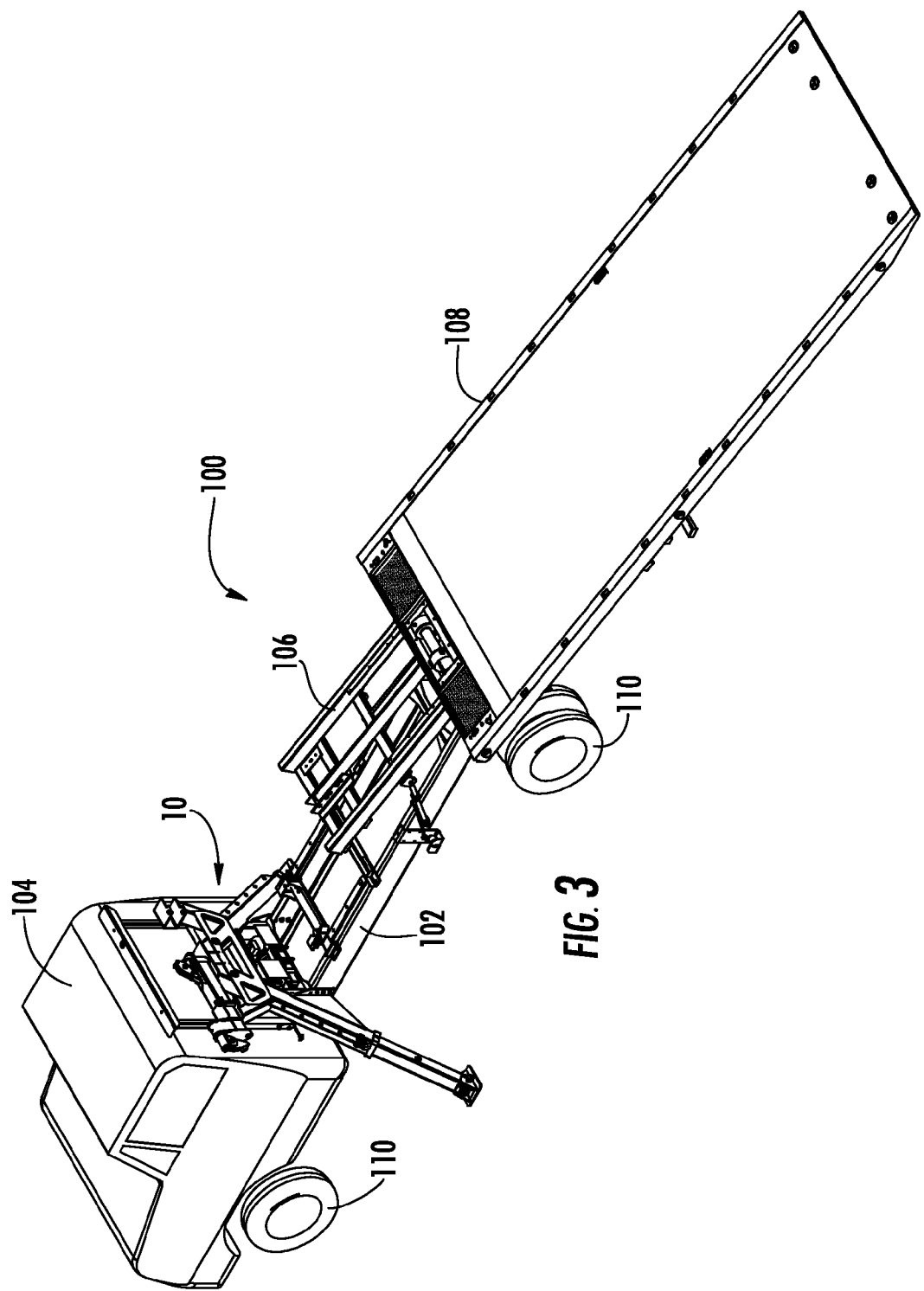
FIG. 3 is another isometric view of the vehicle of FIG. 2.

FIGS. 2 and 3 illustrate side recovery system 10 with a vehicle 100. Vehicle 100 is a self-propelled vehicle that, according to the embodiment illustrated, is a roll-back type transporter referred to broadly herein as a carrier. In addition to side recovery system 10, vehicle 100 generally includes a chassis 102, a cab 104, a sub-frame 106 and a tiltable deck assembly 108 configured support a load (e.g., a disabled vehicle, industrial equipment, container, etc.).

Chassis 102 generally includes the functional parts of vehicle 100 such as a frame (e.g., framework, base, etc.), a suspension, an exhaust system, brakes, a drive system, a drive train, a fuel system, and/or front wheels and rear wheels 110. According to an exemplary embodiment, chassis 102 includes first and second frame members that are arranged as two generally parallel chassis rails extending in a fore and aft direction along a longitudinal axis of the vehicle between a first end (a front end) and a second end (a rear end). The first and second frame members are configured as elongated structural or supportive members (e.g., a beam, channel, tubing, extrusion, etc.) spaced apart laterally and defining a void or cavity which generally constitutes the centerline of vehicle 100.

The plurality of drive wheels 110 are rotatably coupled to chassis 102. The number and/or configuration of wheels 110 may vary depending on the embodiment. According to the embodiment illustrated, vehicle 100 utilizes six wheels 110 (a tandem wheel set at the second end of the vehicle and a single wheel set at the first end of the vehicle). According to the various exemplary embodiments, vehicle 100 may have any number of wheel configurations including, but not limited to, four, eight, or twelve wheels.

Cab 104 is carried and/or supported at the first end of chassis 102 and includes an enclosure or area capable of receiving a human operator or driver. Cab 104 may include controls associated with the manipulation of vehicle 100 (e.g., steering controls, throttle controls, etc.) and optionally may include controls for manipulating side recovery system 10, deck assembly 108 and/or a towing apparatus, such as an underlift system (not shown) provided at the second end of chassis 102.

Side recovery system 10 is configured to be supported by chassis 102 between the back of cab 104 and the front of deck assembly 108. According to an exemplary embodiment, side recovery system 10 is supported closely adjacent to the back of cab 104 and the front of deck assembly 108. Side recovery system 10 is configured so that its size (e.g., depth, etc.) in a fore and aft or longitudinal direction of vehicle 100 is minimized. Such a configuration may allow for the overall length of vehicle 100 to be reduced, which may provide for improved maneuverability. Further, by reducing the overall size of side recovery system 10 in a fore and aft direction, side recovery system 10 may be added to a recovery vehicle with little or no modification to chassis 102 and/or deck assembly 108. Side recovery system 10 is further sized so that it does not substantially cover or block a rear window (not shown) of cab 104 in an effort to improve an operator's line of sight through such a window. To provide for this, the size of side recovery system 10 in a vertical direction (i.e., the overall height of side recovery system 10) is reduced or minimized.

Figure 4:
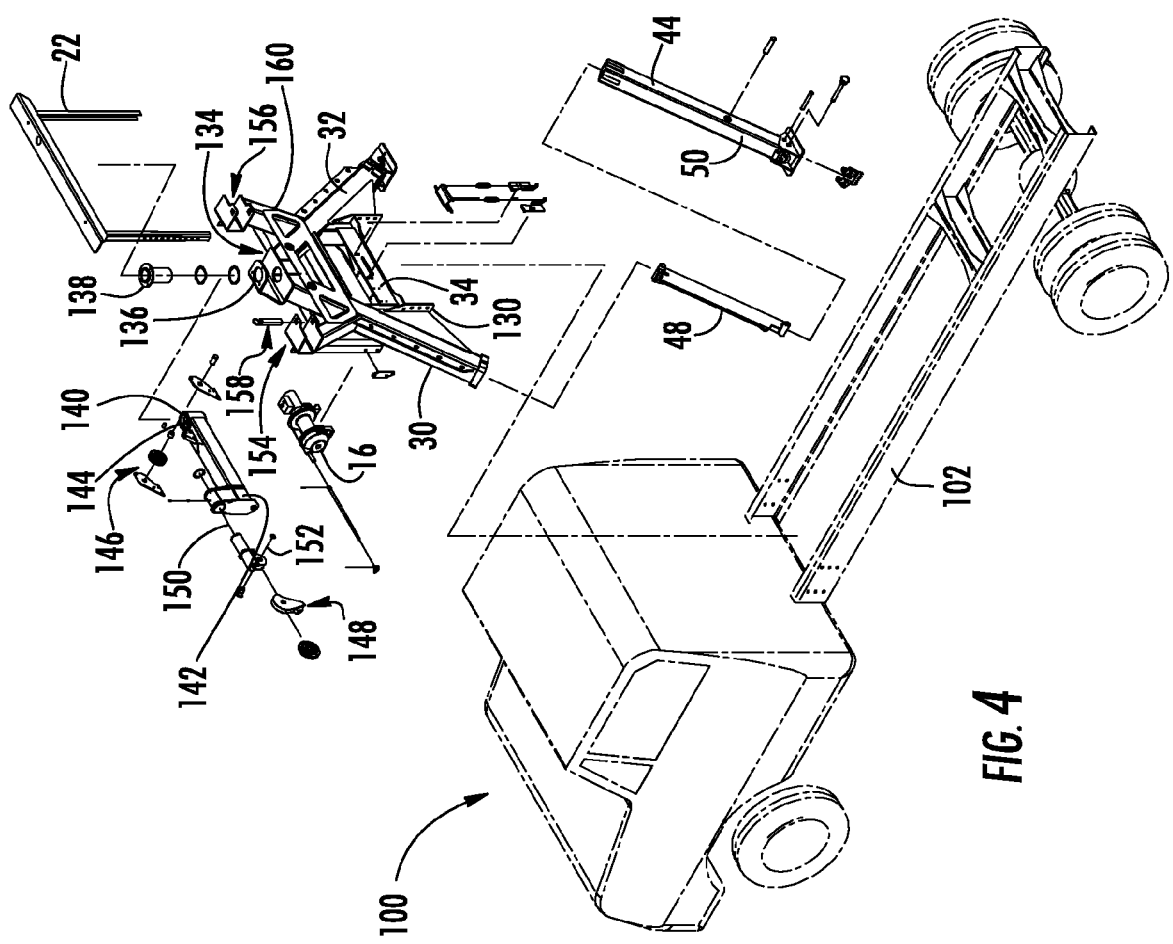
FIG. 4 is an exploded isometric view of the side recovery system shown in FIG. 1.
Figure 5:
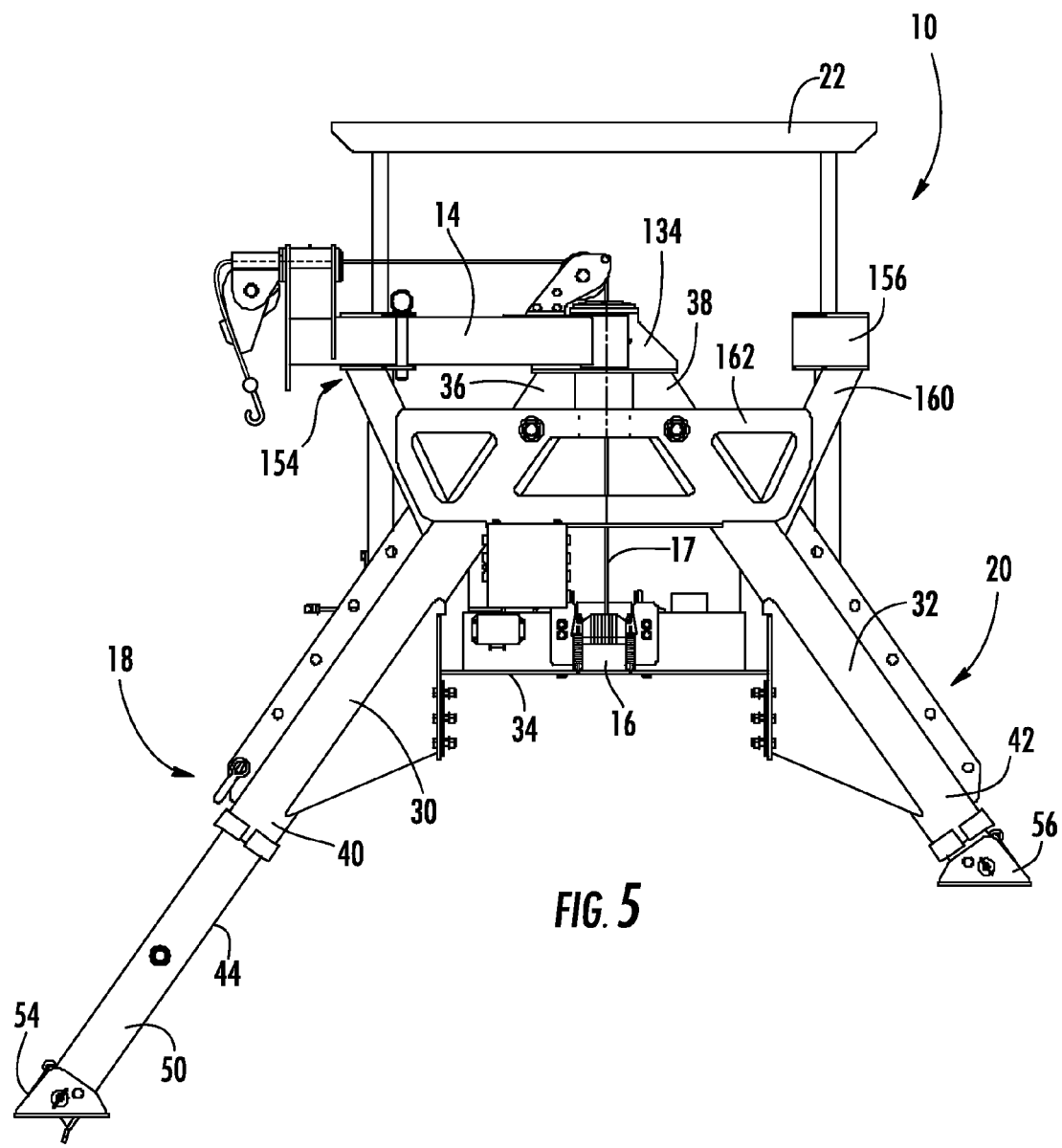
FIG. 5 is rear view of the side recovery system of FIG. 1 illustrating the side recovery system in a first position.
Figure 6:
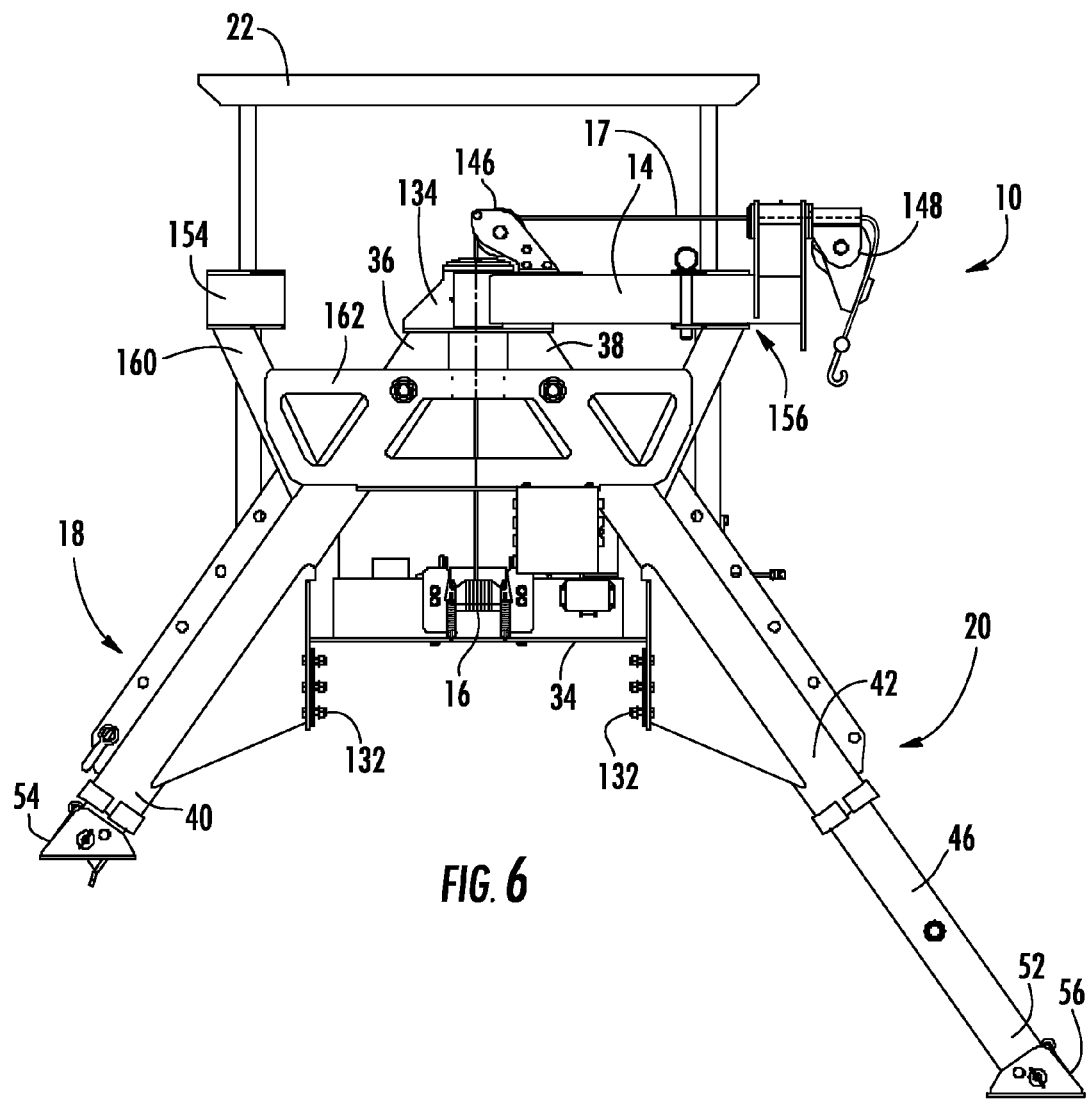
FIG. 6 is rear view of the side recovery system of FIG. 1 illustrating the side recovery system in a second position.

Referring to FIGS. 4 through 6, side recovery system 10 and its components thereof will be described in more detail. FIG. 4 is a partially exploded view of side recovery system 10 relative to vehicle 100, while FIGS. 5 and 6 are rear views of side recovery system 10. According to an exemplary embodiment, base 12 generally includes a first support member 30, a second support member 32 and a third support member 34. According to the embodiment illustrated, first support member 30, second support member 32 and third support member 34 cooperate to define a substantially A-shaped frame structure with first support member 30 and second support member 32 extending downwardly and outwardly relative to a centerline of vehicle 100 and third support member 34 extending generally horizontal therebetween.

According to an exemplary embodiment, first support member 30 and second support member 32 include upper ends 36 and 38 that converge to provide a support platform or area for boom 14. Upper ends 36 and 38 also cooperate to define an aperture, shown as an opening 81, configured to receive a cable 17 (shown in FIGS. 5 and 6) extending from winch 16 to the cable guidance system. As detailed below, opening 81 may also be configured to receive a fastening device (e.g., pivot shaft, etc.) used to secure a first end of boom 14 to base 12. According to an exemplary embodiment, upper ends 36 and 38 are provided at a height that allows boom 14 to be mounted thereon without substantially blocking a rear window (not shown) of cab 104.

First support member 30 and second support member 32 also include lower ends 40 and 42 that are configured to support extensible members 44 (shown in FIG. 5) and 46 (shown in FIG. 6) respectively. First support member 30 and extensible member 44 cooperate to provide first outrigger 18, while second support member 32 and extensible member 46 cooperate to provide second outrigger 20. The support members and the extensible members may be constructed of high strength metals or metal alloy, such as iron or steel. Alternatively, the members may be formed from non-metallic materials such as composites, fiber reinforced composites and/or any other suitable material.

According to an exemplary embodiment, extensible members 44 and 46 are configured for telescopic extension and retraction relative to first support member 30 and second support member 32 respectively. According to the embodiment illustrated, first support member 30 and second support member 32 are tubular members having hollow interiors configured to receive extensible members 44 and 46. Extensible members 44 and 46 have outer peripheries that are substantially similar to the inner peripheries of first support member 30 and second support member 32 to facilitate translational (e.g., sliding, etc.) movement of the extensible members relative to the support members. According to an exemplary embodiment, the support members 30 and 32 and their corresponding extensible members 44 and 46 have rectangular cross sections. According to the various alternative embodiments, these members may have any of a variety of suitable cross sections including, but not limited to, circular, elliptical, triangular, etc.

According to an exemplary embodiment, the telescopic extension and retraction of extensible members 44 and 46 is achieved using one or more actuator devices 48 (shown in FIG. 4). According to the embodiment illustrated, actuator device 48 is a hydraulic actuator device or cylinder having a first end coupled to first support member 30 and a second end coupled to extensible member 44. Although a single hydraulic actuator device is shown for each outrigger, more than one hydraulic actuator device may be used. According to the various exemplary embodiments, actuator device 48 may be any other type of actuator capable of producing mechanical energy for exerting forces suitable for moving the extensible members and supporting a load acting on the outriggers when engaging the ground and/or at least partially supporting the weight of vehicle 100. According to still further alternative embodiments, the outriggers may be manual systems wherein a user is required to move the extensible members relative to the support members without the assistance of an actuator (e.g., by releasing a locking pin and allowing the extensible member to slide to an extended position, etc.).

With extensible members 44 and 46 deployed (i.e., selectively moved to an extended use position), outriggers 18 and 20 provide a wider base or stance for stabilizing vehicle 100 in a lateral direction. Outriggers 18 and 20 may also be capable of stabilizing vehicle 100 in a fore and aft direction. During a typical operation of side recovery system 10, either outrigger 18 or outrigger 20 will be deployed while the other outrigger remains in its retracted stowed position. For example, if side recovery system 10 is being used to manipulate a load that is on the left side of vehicle 100, outrigger 18 will be deployed while outrigger 20 remains stowed (as shown in FIG. 5). Likewise, if side recovery system 10 is being used to manipulate a load that is on the right side of vehicle 100, outrigger 20 will be deployed while outrigger 18 remains stowed (as shown in FIG. 6).

Figure 7:
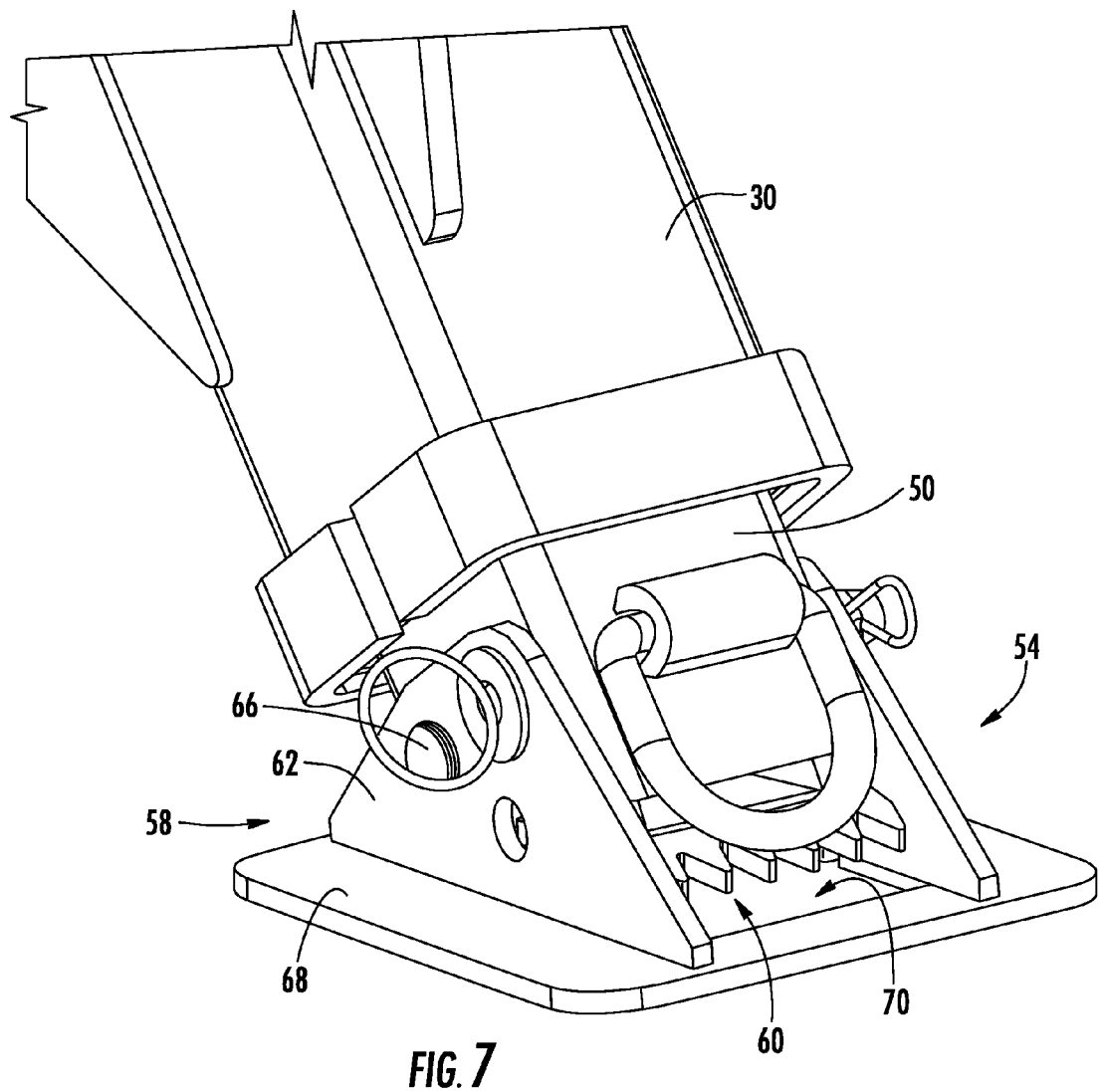
FIG. 7 is a partial isometric view of a stabilizer portion of the side recovery system of FIG. 1 according to an exemplary embodiment illustrated in a first position.
Figure 8:
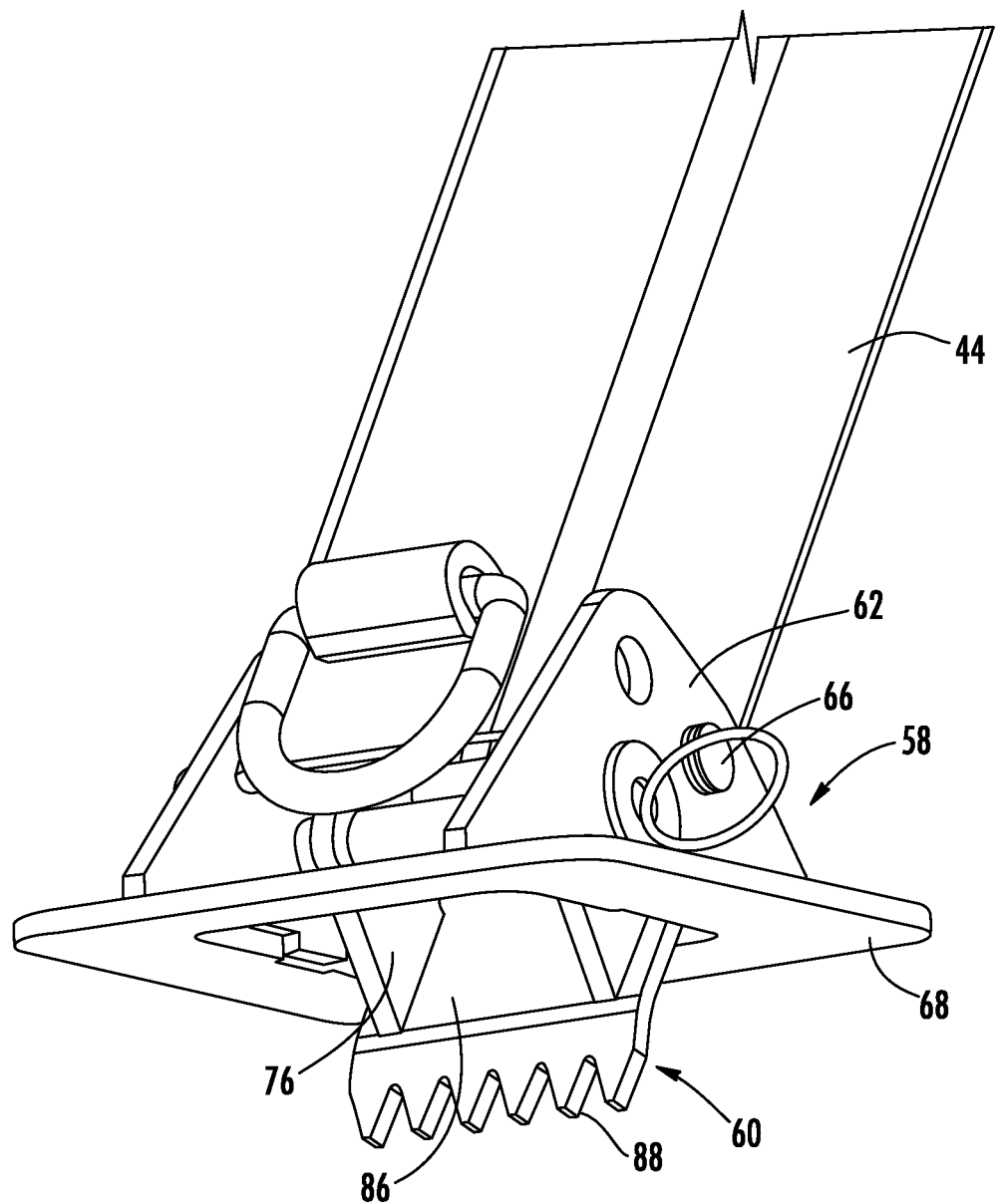
FIG. 8 is another partial isometric view of the stabilizer portion of FIG. 7 illustrated in a second position.

For purposes of this disclosure, the free ends or end-most portions of extensible members 44 and 46 are referred to as distal ends 50 and 52. Distal ends 50 and 52 are each configured to support a ground engaging device (e.g., hide-away stabilizer, flip-down stabilizer, etc.), shown as stabilizer feet 54 and 56, used to stabilize vehicle 100 during operation of side recovery system 10. According to an exemplary embodiment, stabilizer feet 54 and 56 are selectively adjustable between a first position (shown in FIG. 7) wherein stabilizer feet 54 and 56 function as just support feet and a second position (shown in FIG. 8) stabilizer feet 54 and 56 function as spades and support feet. Such a design allows vehicle 100 to be more versatile and/or adaptable to various conditions that may encountered when using side recovery system 10.

In the first position, stabilizer feet 54 and 56 engage a ground surface (e.g., asphalt, dirt, gravel, concrete, sand, etc.) by resting or lying on top of ground surface. This type of engagement with the ground is intended to protect vehicle 100 from tipping over sideways in the direction of a load being engaged by side recovery system 10. In the second position, stabilizer feet 54 and 56 have a first portion that engages the ground surface by penetrating (e.g., digging into, etc.) the ground surface and a second portion that engages the ground surface by resting or lying on top of ground surface. This type of engagement with the ground is intended to generate a tractive force so that vehicle 100 resists sliding in a direction of a load being engaged by side recovery system 10 while continuing to protect vehicle 100 from tipping over sideways in the direction of a load being engaged by side recovery system 10.

Referring to FIG. 9, a partially exploded view of stabilizer foot 54 is shown. Stabilizer foot 54 generally includes a base portion 58 and a movable claw or spade portion 60. Spade portion 60 is selectively movable relative to base portion 58 to provide for the first and second positions of stabilizer foot 54. Base portion 58 includes a substantially horizontal or flat portion, shown as a pad 68, that has a bottom surface that is configured to rest upon the ground surface. Pad 68 further defines an aperture 70 configured to receive spade portion 60. According to the embodiment illustrated, pad 68 is a substantially rectangular member that defines a substantially rectangular aperture 70. According to the various alternative embodiments, pad 68 and/or aperture 70 may have any of variety of shapes (e.g., circular, triangular, etc.).

Upwardly extending from pad 68 is a pair of spaced apart side members 62 that are configured to receive distal end 50 of extensible member 44 therebetween. According to the embodiment illustrated, side members 62 are support adjacent to opposite sides of aperture 70. Side members 62 define a pair apertures, shown as openings 64, configured to be aligned with corresponding apertures provided in distal end 50 of extensible member 44. Openings 64 are configured to receive a pivot pin or shaft 66 which couples stabilizer foot 54 to extensible member 44 and allows stabilizer foot 54 to pivot or rotate relative to extensible member 44. One or more locking devices 67 (e.g., locking rings, clips, etc.) are used to secure pivot shaft 66 to stabilizer foot 54 and extensible member 44. Pivot shaft 66 defines an axis about which stabilizer foot 54 is configured to rotate relative to extensible member 44. Pivotally coupling stabilizer foot 54 to distal end 50 of extensible member 44 allows stabilizer foot 54 to provide stable footing on uneven surfaces by allowing stabilizer foot 54 to substantially conform to the contour of the ground surface.

Side members 62 also define a second pair of apertures, shown as openings 72. As detailed below, openings 72 are configured to be aligned with corresponding openings provided in spade portion 60 to support spade portion 60 in either the first position or the second position. Openings 72 are configured to receive a latching or locking mechanism, shown as a locking pin 74, which is configured to be selectively released and engaged to allow spade portion 60 to move between the first position and second position.

Spade portion 60 generally includes a pair of spaced apart and generally upright adjustment members 76 and an anchor blade 78. Adjustment members 76 extend outward from anchor blade 78 and include a structure that allows spade portion 60 to be secured in both the first position (e.g., retracted position, etc.) and the second position (e.g., extended position, etc.). Adjustment members 76 define a first pair of apertures, shown as openings 80, a second pair of apertures, shown as openings 82, and a third pair of apertures, shown as openings 82. According to an exemplary embodiment, spade portion 60 is configured to be rotated relative to base portion 58 to achieve the first position and second position. Openings 80 are configured to align with openings 64 in base portion 58 and the corresponding openings in extensible member 44 and to receive pivot shaft 66 to provide for the rotational movement of spade portion 60 relative to base portion 58.

Openings 82 are configured to be aligned with openings 72 in base portion 58 and receive locking pin 74 when stabilizer foot 54 is to be moved to the first position. Openings 84 are configured to be aligned with openings 72 in base portion 58 and receive locking pin 74 when stabilizer foot 54 is to be moved to the second position. When an operator desires to change the configuration of stabilizer foot 54 between the first position and the second position, the operator will release locking pin 74 (e.g., by removing the pin, etc.) and will thereafter rotate spade portion 60 about pivot shaft 66 until the desired position is achieved and either openings 82 or openings 84 are aligned with openings 72. The operator will then reengage locking pin 74 to secure stabilizer foot 54 in the desired position.

According to the various alternative embodiments, any number of openings, at any number of locations, made be provided in spade portion 60 to achieve the desired positioning of spade portion 60 relative to base portion 58. According to further alternative embodiments, a plurality of adjustment openings or holes may be provided in base portion 58 (e.g., side members 62) and a single alignment opening or hole may be provided in spade portion 60 (e.g., adjustment members 76, etc.). According to still further alternative embodiments, additional holes may be provided so that spade portion 60 may be locked into a position (e.g., an intermediate position, etc.) that is between the first position and the second position.

According to an exemplary embodiment, anchor blade 78 has a generally flat configuration that defines a friction surface 86. Anchor blade 78 can include a tapered cross section that allows the anchor blade to more easily penetrate a ground surface and generate a tractive or frictional force in the direction of a load being engaged by side recovery system 10 that prevents vehicle 100 from moving (e.g., sliding, etc.) during operation of side recovery system 10. Preferably, friction surface 86 will be positioned substantially perpendicular with respect to the cable outwardly extending from side recovery system 10 to the load being engaged. The closer that friction surface 86 is to perpendicular to the cable, the greater then tractive force that can be generated, and therefore, the greater the stability of vehicle 100.

According to the embodiment illustrated, anchor blade 78 includes a plurality of teeth 88 along a lower edge of friction surface 86. Teeth 88 function to further improve penetration of anchor blade 78 into the ground during operation of side recovery system 10. According to the various alternative embodiments, teeth 88 may be designed to have any of a number for profiles (e.g., conical, pyramidal, etc.).

When spade portion 60 is selectively moved to and secured in the first position, anchor blade 78 is sized to fit within the periphery of aperture 70. According to an exemplary embodiment, when spade portion 60 is in the first position, anchor blade 78 may be recessed or offset from the bottom surface of pad 68 a distance that does not allow anchor blade 78 to substantially contact the ground surface when the bottom surface of pad 68 engages the ground surface. According to another exemplary embodiment, when spade portion 60 is in the first position, a backside of anchor blade 78 (i.e., a substantially flat surface opposite friction surface 86) may be configured to be substantially coplanar with the bottom surface of pad 68. Such a configuration may allow spade portion 60 to assist pad 68 in stabilizing vehicle 100 when stabilizer foot 54 is in the first position.

When spade portion 60 is selectively moved to and secured in the second position, anchor blade 78 is configured to penetrate the ground surface while the bottom surface of pad 68 is configured to rest on top of the ground surface. Such a configuration advantageously allows stabilizer foot 54 to protect vehicle 100 against sliding and tipping at the same time. Anchor blade 78 may be configured or sized so that the point at which the bottom surface of pad 68 would come into contact with the ground surface can be controlled.

Referring back to FIGS. 4 through 6, third support member 34 is shown as extending in a substantially horizontal direction between first support member 30 and second support member 32. Third support member 34 is configured to support winch 16, a motor for powering winch 16 and/or the control systems of various components of side recovery system 10 (e.g., controls for winch 16, boom 14 and/or extensible members 44 and 46, etc.). Third support member 34 is configured to be supported on the rails of chassis 102 and includes a structure for mounting side recovery system 10 to chassis 102.

To facilitate the securement of side recovery system 10 to chassis 102, third support member 34 includes a flange 130 defining a plurality of apertures (e.g., openings, holes, etc.). The apertures in flange 130 are configured to be aligned with corresponding apertures in chassis 102 and are configured to receive bolts 132 or other suitable fasteners for securing side recovery system 10 to chassis 102. According to the various alternative embodiments, side recovery system 10 may be secured to chassis 102 using a variety of known or otherwise suitable techniques including, but not limited to, a welding operation, etc.

According to the embodiment illustrated, third support member 34 lies within substantially the same vertical plane as first support member 44 and second support member 46. This allows winch 16 to also be supported within substantially the same vertical plane. Positioning the components of side recovery system 10 within substantially the same vertical plane allows the size of side recovery system 10 to be reduced in the fore and aft direction of vehicle 100.

As mentioned above, upper ends 36 and 38 of first and second support members 30 and 32 provide support for boom 14. According to the embodiment illustrated, boom 14 is supported so that rotates (e.g., pivots, swivels, etc.) between opposite lateral sides of vehicle 100 while remaining at an orientation that is substantially horizontal or parallel to a ground surface or a deck surface of deck assembly 108. Such movement is possible if there are no obstructions rearward of side recover system 100.

Referring to FIG. 4, supported on top of first and second support members 30 and 32 is a first or center receiving bracket 134. Center receiving bracket 134 is shown as a substantially C-shaped bracket with a substantially vertical wall extending between two substantially horizontal walls. The substantially horizontal walls define an aperture 136 configured to receive pivot shaft 138 or other suitable fastener for rotatably securing boom 14 to base 12. The horizontal walls are spaced apart in a vertical direction a distance that is substantially equal to the height of boom 14, which is received within the open front of the C-shaped bracket. According to the various alternative embodiments, center receiving bracket 134 may be any of a variety of mechanisms or structures capable of securing boom 14 to base 12.

Boom 14 extends between a first end 140 and a second end 142. First end 140 is configured to be supported near or at the centerline of vehicle 100 and defines an aperture 144. Aperture 144 is configured to be aligned with aperture 136 of center receiving bracket 134 and receive pivot shaft 138, which defines the vertical axis of rotation of boom 14. Aperture 144 is also configured to receive cable 17 extending from winch 16 to cable guidance system 19.

Still referring to FIG. 4, cable guidance system 19 is shown as being supported at boom 14. According to an exemplary embodiment, cable guidance system 19 includes a first sheave 146 and a second sheave 148. First sheave is coupled at first end 140 of boom 14, while second sheave 148 is coupled at second end 142 of boom 14. According to the embodiment illustrated, first sheave 146 is fixedly coupled to an upper surface of boom 14, whereas second sheave 148 is configured to rotate about a first axis 150 that is substantially parallel with boom 14 and a second axis 152 that is substantially perpendicular to boom 14.

As boom 14 is selectively rotated about pivot shaft 138, cable 17 remains engaged with first sheave 146 and second sheave 148. The free end of cable 17 extending from second sheave 146 is configured to support a hook or some other typed of device configured to engage the load to be manipulated by side recovery system 10. Allowing cable 17 to remain engaged with cable guidance system 19 during the movement of boom 14 between the first position and the second position, may reduce the amount of setup time that is needed to configure side recovery system 10 for operation.

Referring to FIGS. 5 and 6, side recovery system 10 also includes a pair of end support members, shown as a first end receiving bracket 154 and a second end receiving bracket 156, for supporting second end 142 of boom 14. Utilizing separate brackets to support second end 142 of boom 14, rather than a continuous member extending the width of vehicle 100, may advantageously allow for the overall weight of side recovery system 10 to be reduced. Although, according to the various alternative embodiments, a continuous one-piece member could be utilized.

According to an exemplary embodiment, first and second end receiving brackets 154, 156 are shown as a substantially C-shaped brackets with a substantially vertical walls extending between two substantially horizontal walls. The substantially horizontal walls define an aperture 158 configured to receive a locking mechanism, shown as a locking pin 158 or other suitable fastener for securing second end 142 of boom 14 in either the first position or the second position. The horizontal walls are spaced apart in a vertical direction a distance that is substantially equal to the height of boom 14, which is received within the open front of the C-shaped brackets. According to the various alternative embodiments, first and second end receiving brackets 154, 156 may be any of a variety of mechanisms or structures capable of securing second end 142 of boom 14.

When an operator desires to change the positioning of second end 142 of boom 14 between a first side of vehicle 100 and a second side of vehicle 100, the operator will release locking pin 158 (e.g., by removing the pin, etc.) and will thereafter rotate or swing boom 14 about pivot shaft 138 until second end 142 of boom 14 is received by the other end receiving bracket (or cause the rotation or swinging movement of boom 14 by actuating a user interface or control). Once received within the desired end receiving bracket, the operator will then engage locking pin 158 into the aperture 156 of that particular end receiving bracket to secure boom 14 in the desired position. Movement of boom 14 between the first and second position and/or movement of locking pin 158, may be done manually, or alternatively, may be done with the assistance of an actuator device (e.g., a powered turret or turntable, a hydraulic actuator, a geared drive motor, etc.).

First and second end receiving brackets 154, 156 are supported by a pair of frame members, shown as bracket supports 160. Bracket supports 160 are shown as being angled members outwardly extending from first and second support members 30 and 32. According to the various alternative embodiments, bracket supports 160 may be substantially vertical members extending from first and second support members 30 and 32. Like third support member 34, bracket supports 160 are provided within substantially the same vertical plane as first support member 44 and second support member 46 to reduce the size of side recovery system in the fore and aft direction of vehicle 100.

Extending across side recovery system 10 is a cross support or brace member 160. Brace member 162 is provided below the upper periphery of base 12 and above third support member 34. Brace member 162 is coupled to bracket supports 160 and first and second support members 30 and 32 to provide additional rigidity to side recovery system 10. According to an exemplary embodiment, a first brace member 160 is coupled to the rear of side recovery system 10, while a second brace member 160 is coupled to the front of side recovery system 10.

Referring further to FIG. 4, auxiliary support structure 22 is a configured as a headboard or a light pylon for vehicle 100. Auxiliary support structure 22 is adjustable in a vertical direction to accommodate vehicles having cabs at various heights.

The construction and arrangement of the elements of the side recovery system and the vehicle as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the side recovery system may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A side recovery system comprising:
    a boom having a first end and a second end, the boom being rotatable about the first end between a first position and second position;
    a first sheave coupled to the first end of the boom and a second sheave coupled to the second end of the boom;
    a base having:
        a portion for supporting the first end of the boom;
        a first receiving structure including a first vertical wall extending between a first pair of horizontal flanges, the first receiving structure configured to secure the second end of the boom when the boom is in the first position; and
        a second receiving structure including a second vertical wall extending between a second pair of horizontal flanges, the second receiving structure configured to secure the second end of the boom when the boom is in the second position,
        wherein the boom extends through the first receiving structure when the boom is in the first position and the boom extends through the second receiving structure when the boom is in the second position; and
    a locking device configured to selectively engage the first receiving structure and the second receiving structure for securing the second end of the boom.

2. The system of claim 1 wherein the boom rotates about an axis that extends in a substantially vertical direction.

3. The system of claim 1 wherein the boom is secured in a substantially horizontal orientation in the first position and the second position.

4. The system of claim 3 wherein the boom remains in the substantially horizontal orientation when rotating between the first position and the second position.

5. The system of claim 1 wherein the base is a substantially A-shaped structure having a pair of angled support members and a horizontal support member extending therebetween.

6. The system of claim 5 wherein the pair of angled support members and the horizontal support member are provided within the same vertical plane.

7. The system of claim 5 wherein the horizontal support member supports a winch configured to supply a cable for the boom.

8. The system of claim 7 wherein the base and boom each include an aperture that is concentric to an axis of rotation for the boom and the cable is configured to pass through such apertures.

9. The system of claim 5 further comprising a member supported at lower ends of the angled support members and configured to facilitate translational movement relative thereto, the members having distal ends supporting stabilizers configured to be selectively adjusted between a first position wherein the stabilizers are configured to protect against tipping and a second position wherein the stabilizers are configured to protect against sliding.

10. The system of claim 9 wherein the stabilizers are configured to protect against both tipping and sliding when in the second position.

11. The system of claim 9 wherein the stabilizers include a base portion and a spade portion, the base portion being pivotally coupled to the distal end of the angled support member about a first axis and the spade portion being pivotally coupled to the base portion about the first axis.

12. The system of claim 11 wherein the spade portion includes a first aperture associated with the first position and a second aperture associated with the second position, the first and second apertures being selectively aligned with a corresponding aperture in the base portion to achieve a desired positioning for the stabilizer.

13. The system of claim 12 further comprising a locking device for selectively engaging the first and second apertures.

14. The system of claim 1 wherein an orientation of the first sheave is fixed relative to the first end of the boom.

15. A vehicle comprising:
    a chassis;
    a side recovery system supported at the chassis, the side recovery system comprising:
        a boom having a first end and a second end, the boom being rotatable about the first end between a first position and second position;
        a first sheave coupled to the first end of the boom and a second sheave coupled to the second end of the boom;
        a base having:
            a portion for supporting the first end of the boom;
            a first receiving structure including a first vertical wall extending between a first pair of horizontal flanges, the first receiving structure configured to secure the second end of the boom when the boom is in the first position; and a second receiving structure including a second vertical wall extending between a second pair of horizontal flanges, the second receiving structure configured to secure the second end of the boom when the boom is in the second position, wherein the boom extends through the first receiving structure when the boom is in the first position and the boom extends through the second receiving structure when the boom is in the second position; and a locking device configured to selectively engage the first receiving structure and the second receiving structure for securing the second end of the boom.

16. The vehicle of claim 15 further comprising a cab and a tilt deck assembly, the side recovery system being supported between the cab and the deck assembly.

17. The vehicle of claim 16 wherein the side recovery system supports an auxiliary support structure configured to support a light system for the vehicle, the auxiliary support structure being adjustable in a substantially vertical direction to accommodate cabs of various heights.

* * * * *